(12) United States Patent
Remillard et al.

(10) Patent No.: US 7,319,805 B2
(45) Date of Patent: Jan. 15, 2008

(54) ACTIVE NIGHT VISION IMAGE INTENSITY BALANCING SYSTEM

(75) Inventors: Jeffrey T. Remillard, Ypsilanti, MI (US); Kenneth E. Nietering, Dearborn, MI (US); Willes H. Weber, Ann Arbor, MI (US); David J. Scholl, Huntington Woods, MI (US); Michael A Marinelli, Northville, MI (US)

(73) Assignees: Ford Motor Company, Dearborn, MI (US); Lear Corporation, Southfield, MI (US)

( * ) Notice: Subject to any disclaimer, the term of this patent is extended or adjusted under 35 U.S.C. 154(b) by 623 days.

(21) Appl. No.: 10/679,915

(22) Filed: Oct. 6, 2003

(65) Prior Publication Data

US 2005/0074221 A1    Apr. 7, 2005

(51) Int. Cl.
*G06K 9/00* (2006.01)

(52) U.S. Cl. ............... 385/147; 382/103; 382/104; 382/100

(58) Field of Classification Search ............... 382/117, 382/104, 294, 270, 103, 107; 250/330; 600/300
See application file for complete search history.

(56) References Cited

U.S. PATENT DOCUMENTS

| | | | |
|---|---|---|---|
| 5,056,097 A | 10/1991 | Meyers | |
| 5,383,200 A | 1/1995 | Barrett et al. | |
| 5,528,656 A * | 6/1996 | Annis | 378/98.2 |
| 5,635,905 A | 6/1997 | Blackburn et al. | |
| 5,747,792 A | 5/1998 | Kintz et al. | |
| 5,790,234 A * | 8/1998 | Matsuyama | 351/212 |
| 6,088,470 A * | 7/2000 | Camus et al. | 382/117 |
| 6,550,949 B1 | 4/2003 | Bauer et al. | |
| 2002/0191388 A1 | 12/2002 | Matveev | |
| 2003/0060956 A1 | 3/2003 | Rao et al. | |
| 2003/0076981 A1 | 4/2003 | Smith et al. | |
| 2004/0105027 A1* | 6/2004 | Kawamura et al. | 348/362 |

* cited by examiner

*Primary Examiner*—Jingge Wu
*Assistant Examiner*—Jayesh A Patel
(74) *Attorney, Agent, or Firm*—Earl LaFontaine; Frank MacKenzie

(57) ABSTRACT

A vision system (10) for a vehicle (14) includes a light source (46) that generates an illumination beam (20). A receiver (62) generates a first image signal and a second image signal. The first image signal is generated in response to a reflected portion of the illumination beam (20). A controller is coupled to the light source (46) and the receiver (62). The controller generates an image in response to the first image signal and the second image signal.

2 Claims, 6 Drawing Sheets

ACTIVE NIGHT VISION IMAGE INTENSITY BALANCING SYSTEM

TECHNICAL FIELD

The present invention relates to night vision systems. More particularly, the present invention is related to a system and method of balancing pixel intensity of an active night vision system image.

BACKGROUND OF THE INVENTION

Night vision systems allow a vehicle occupant to better see objects during relatively low visible light level conditions, such as at nighttime. Night vision systems typically are classified as either passive night vision systems or active night vision systems. Passive systems simply detect ambient infrared light emitted from the objects within a particular environment. Active systems utilize a near infrared (NIR) light source to illuminate a target area and subsequently detect the NIR light reflected off objects within that area.

Passive systems typically use far-infrared cameras that are characterized by low resolution and relatively low contrast. Such cameras must be located on the vehicle exterior in order to acquire requisite infrared energy in the operating environment. Externally mounted cameras can negatively affect vehicle styling. Far-infrared cameras are also costly to manufacture and generate non-intuitive images that can be difficult to interpret.

Active systems provide improved resolution and image clarity over passive systems. Active systems utilize laser or incandescent light sources to generate an illumination beam in the near infrared spectral region and charge-coupled devices or CMOS cameras to detect the reflected NIR light.

Diode lasers are preferred over incandescent light sources for several reasons. Incandescent light sources are not monochromatic like diode lasers, but instead emit energy across a large spectrum, which must be filtered to prevent glare onto oncoming vehicles. Filtering a significant portion of the energy generated from a bulb is expensive, energy inefficient, and generates undesired heat. Also, filter positioning is limited in incandescent applications, since the filter must be located proximate an associated light source. As well, multiple incandescent sources are often required to provide requisite illumination, thus increasing complexity and costs.

In an active night vision system a NIR laser is used to illuminate a target area. A camera is used in conjunction with the laser to receive reflected NIR light from objects within the target area. The laser may be pulsed with a duty cycle of approximately 25-30%. The camera may be operated in synchronization with the laser to capture an image while the laser is in an "ON" state.

The camera typically contains a band-pass filter that allows passage of light that is within a narrow range or band, which includes the wavelength of the light generated by the laser. The combination of the duty cycle and the use of the band-pass filter effectively eliminates the blinding effects associated with headlamps of oncoming vehicles. The term "blinding effects" refers to when pixel intensities are high due to the brightness of the oncoming lights, which causes an image to be "flooded out" or have large bright spots such that the image is unclear.

Although laser-based night vision systems can overcome the blinding effects of oncoming headlamps, they cannot overcome blinding effects associated with highly reflective objects. For example, many signs have highly reflective surfaces for reflection of incandescent light, such as emitted from vehicle headlamps, for direct viewing ease by a vehicle operator. The signs are often covered with retroreflective paint that can reflect a large amount of light and cause image saturation. A saturated image is generally unclear and unreadable. Large flat surfaces, such as on trucks, buses, and vans, can also cause image saturation. Image saturation from the stated flat surfaces typically occurs when the flat surfaces are within approximately 20-40 m of the host vehicle.

Thus, there exists a need for an improved active night vision system and method of generating images that minimizes or eliminates the blinding and saturating effects due to the presence of highly reflective objects within a target area of a vehicle.

SUMMARY OF THE INVENTION

The present invention provides a vision system for a vehicle. The vision system includes a light source that generates an illumination beam. A receiver generates a first image signal and a second image signal. The first image signal is generated in response to a reflected portion of the illumination beam. A controller is coupled to the light source and the receiver. The controller generates an image in response to the first image signal and the second image signal.

The embodiments of the present invention provide several advantages. One such advantage that is provided by several embodiments of the present invention is the provision of utilizing a single receiver to generate dual image signals. In so doing the present invention minimizes system costs and complexity.

Another advantage that is provided by multiple embodiments of the present invention is the provision of generating an image through the fusion of dual images, which improves image clarity of a target area.

Furthermore, the present invention provides an active night vision system that is inexpensive, versatile, and robust. The present invention provides multiple algorithms that may be applied in various applications and a variety of driving environments to generate images of a target area.

Moreover, the present invention provides an efficient active night vision system, which may be operated to generate images in real time.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be made to the embodiments illustrated in greater detail in the accompanying figures and described below by way of examples of the invention where.

DETAILED DESCRIPTION

Figure 1:
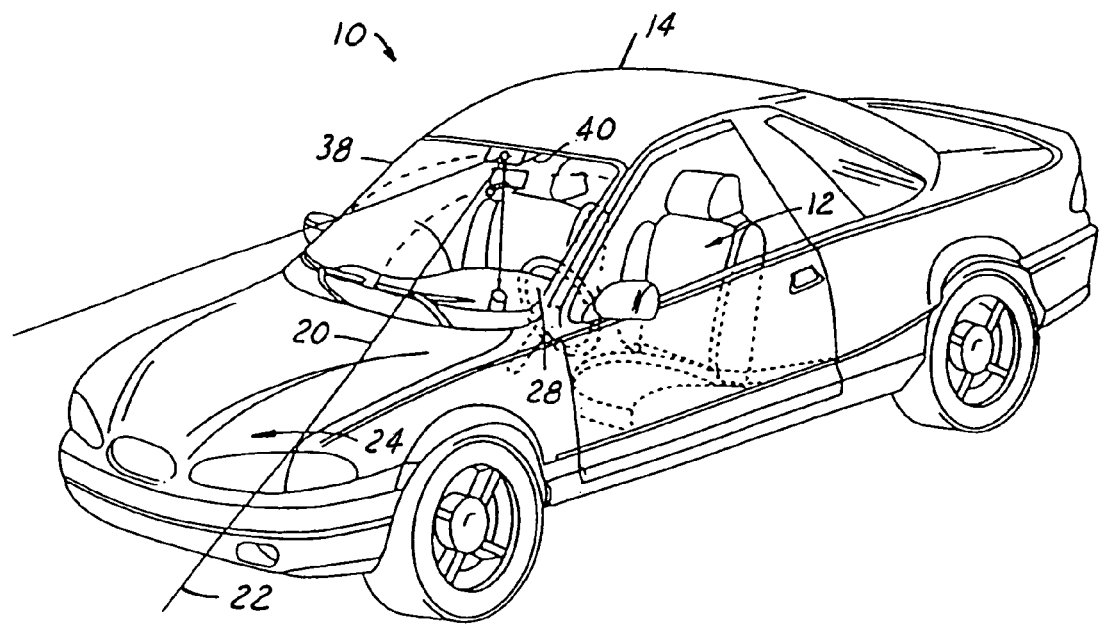
FIG. 1 is a front perspective view of an active night vision system in accordance with an embodiment of the present invention.

In the following figures the same reference numerals will be used to refer to the same components. While the present invention is described with respect to a system and method of balancing pixel intensity of an active night vision system image, the present invention may be applied in various applications where near infrared imaging is desired, such as in adaptive cruise control applications, in collision avoidance and countermeasure systems, and in image processing systems. The present invention may be applied in various types and styles of vehicles as well as in non-vehicle applications.

Also, although the present invention is described with respect to an illumination system that is configured to be mounted within an overhead console of a vehicle, the present invention may be applied to light sources within or exterior to an interior cabin of a vehicle.

In the following description, various operating parameters and components are described for one constructed embodiment. These specific parameters and components are included as examples and are not meant to be limiting.

Additionally, in the following description the term "near infrared light" refers to light having wavelengths within the 750 to 1000 nm spectral region. The term also at least includes the spectrum of light output by the particular laser diode source disclosed herein.

Figure 2:
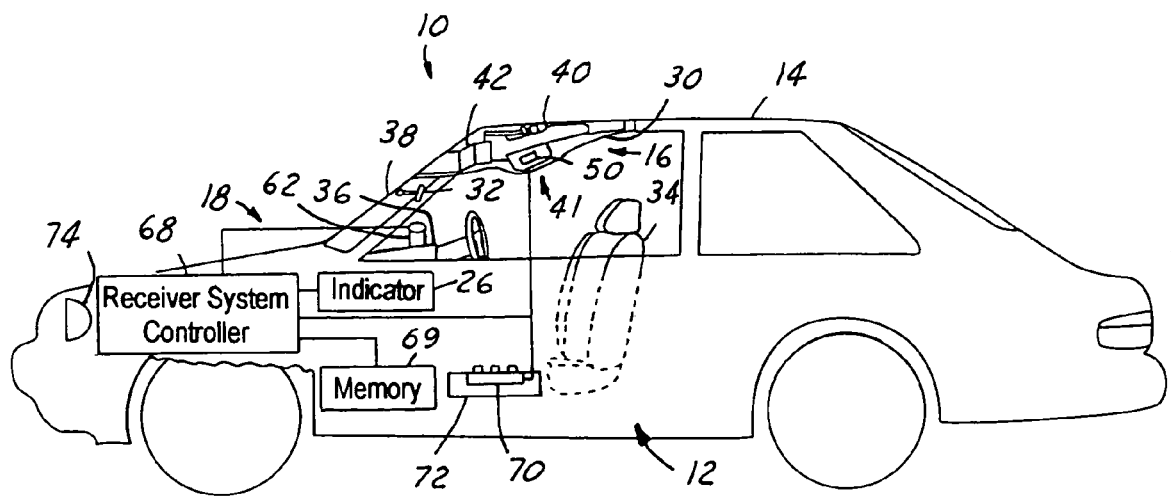
FIG. 2 is a side perspective and block diagrammatic view of the active night vision system in accordance with an embodiment of the present invention.

Referring now to FIGS. 1 and 2, front and side perspective views of an active night vision system 10 in accordance with an embodiment of the present invention are shown. The vision system 10 is configured for an interior passenger cabin 12 of a host vehicle 14. The vision system 10 includes an illumination system 16 and a receiver system 18. The illumination system 16 generates an illumination beam 20 having a beam pattern 22, which is directed towards a target area 24 that is forward of the vehicle 10. Portions of the illumination beam 20 are reflected off objects (not shown) within the target area 24 and are received by the receiver system 18. The receiver system 18 indicates to vehicle occupants, via an indicator 26, detection of the objects in response to reflected portions of the illumination beam 20. The receiver system 18 generates fused image signals, which are a combination of generated illuminated image signals and non-illuminated image signals, to provide a clear active night vision image of the target area 24. The techniques used to generate the fused image signals are described in further detail below.

The illumination system 16 is configured to be mounted within an overhead console 30 above a rearview mirror 32, and the receiver system 18 is configured to be mounted forward of a driver seat 34 on a dashboard 36. Of course, the illumination system 16 and the receiver system 18 may be mounted in other locations around the windshield 38 as well as other window and non-window locations within the vehicle 14.

Figure 3:
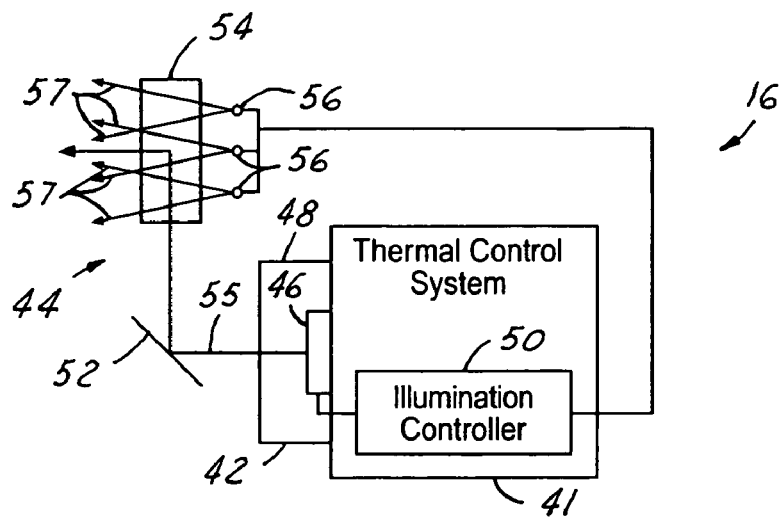
FIG. 3 is a block diagrammatic view of an illuminator system in accordance with an embodiment of the present invention.

Referring also to FIG. 3, a block diagrammatic view of the illuminator system 16 in accordance with an embodiment of the present invention is shown. The illumination system 16 includes an illuminator assembly 40 and may include a thermal control system 41.

The illuminator assembly 40 includes a light source assembly 42 that generates light, which may be emitted from the assembly 42 in the form of an illumination beam, such as beam 20. Light generated from the light assembly 42 is directed through an optic assembly 44 where it is collimated to generate the illumination pattern 22. The illumination beam 20 is emitted from the light assembly 42 and passed through the windshield 38. The light assembly 42 includes a light source 46 that is contained within a light source housing 48. The light source 46 also receives an illumination signal from the illumination controller 50. The intensity of the illumination beam 20 is directly proportional to the voltage of the illumination signal. The illumination signal is converted into a current level that is supplied to the light source 46.

The light source 46 may be of various types and styles. In one embodiment of the present invention, the light source 46 is a NIR diode laser that has desired monochromatic and illumination characteristics. The diode laser may, for example, be a Single Stripe Diode Laser, Model No. S-81-3000-C-200-H manufactured by Coherent, Inc. of Santa Clara, Calif.

The optical system 44 includes the light assembly 42, the light coupler 52, and the beam-forming optic 54. Light from the light source 46, represented by arrow 55, is emitted towards and is reflected by the light coupler 52 to the optic 54, where it is again reflected towards and through the windshield 38. The light coupler 52 and the optic 54 may be contained within a component alignment maintaining module or housing (not shown). The optical system 44 may also include a series of light emitting diodes (LEDs) 56 or the like for performing color mitigation and for adjusting perceived color of the illumination beam 20 as it is emitted from the illuminator assembly 16. The light emitted by the LEDs 56 is represented by the arrows 57.

The light coupler 52 may be in the form of a mirror, as shown, a series of mirrors, a fiber optic cable, or other reflective or light transporting device known in the art. In the embodiment as described, light is emitted from the light source 46 in the form of an elliptically shaped beam with a spread angle of approximately 20-50°. The beam is reflected at approximately a 90° angle by the light coupler 52 to enter the optic 54. Although the present invention is described with respect to the incorporated use of a light coupler 52, the present invention may be modified to have direct emission of light between the light source 46 and the optic 54, without use of a light coupler 52.

Although the optic 54 may be in the form of a thin sheet optical element, it may also be in some other form. Continuing from the above-described embodiment, the optic 54 expands and reflects the light generated by the light source 46 at approximately a 90° angle to direct the light forward of the vehicle 14. Light from the light source 46 enters and is reflected and/or collimated by the optic 54, and is then reflected and emitted through the windshield 38. Also, although a single optic is shown, additional optics may be incorporated within the illumination system 16 to form a desired beam pattern onto a target external from the vehicle 14.

The optic 54 may be formed of plastic, acrylic, or of some other similar material known in the art. The optic 54 can utilize the principle of total internal reflection (TIR) and form the desired beam pattern with a series of stepped facets (not shown). An example of a suitable optical element is disclosed in U.S. Pat. No. 6,422,713 entitled "Thin-Sheet Collimation Optics For Diode Laser Illumination Systems For Use In Night-Vision And Exterior Lighting Applications".

The thermal control system 41 may be used to control the operating temperature of the light source 46. The thermal control system may include thermal sensors, cooling devices, heaters, heat sinks, as well as other thermal control devices known in the art. By having the thermal system 41 within the illumination system 16, the temperature of the light source 46 may be controlled without adjusting the temperature of the interior cabin 12.

The illumination controller 50 may be microprocessor based such as a computer having a central processing unit, memory (RAM and/or ROM), and associated input and output buses. The controller 50 may be an application-specific integrated circuit or may be formed of other logic devices known in the art. The controller 50 may be a portion of a central vehicle main control unit, an interactive vehicle dynamics module, a restraints control module, a main safety controller, a control circuit having a power supply, combined into a single integrated controller, or may be a stand-alone controller as shown.

Figure 4:
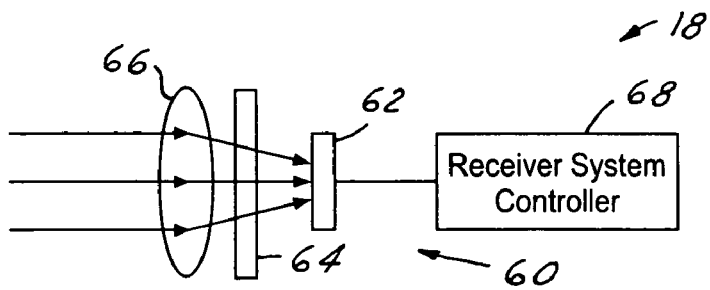
FIG. 4 is a block diagrammatic view of a receiver system in accordance with an embodiment of the present invention.

Referring now to FIG. 4, a block diagrammatic view of the receiver system 18 in accordance with an embodiment of the present invention is shown. The receiver system 18 includes a receiver assembly 60 having a first receiver 62, a filter 64, a lens 66, and a receiver system controller 68.

The first receiver 62 may be in the form of a charge-coupled device (CCD) or a complementary metal oxide semiconductor (CMOS) sensor. A camera, such as Model No. Wat902HS manufactured from Watec America Corporation of Las Vegas, Nev. may, for example, be used as the receiver assembly 60. Near infrared light reflected off objects is received by the receiver 62 to generate an image signal.

The filter 64 is used to filter the light entering the camera. The filter 64 may be an optical band-pass filter that allows light, within a near infrared light spectrum, to be received by the receiver 62. The filter 64 may correspond with wavelengths of light contained within the illumination signal 20. The filter 64 prevents blooming caused by the lights of oncoming vehicles or objects. The filter 64 may be separate from the lens 66 and the receiver 62, as shown, or may be in the form of a coating on the lens 66 or a coating on a lens of the receiver 62, when applicable. The filter 64 may be a multistack optical filter located within the receiver 62.

In an embodiment of the present invention, the center wavelength of the filter 64 is approximately equal to an emission wavelength of the light source 46 and the filter full-width-at-half-maximum is minimized to maximize rejection of ambient light. Also, the filter 64 is positioned between the lens 66 and the receiver 62 to prevent the presence of undesirable ghost or false images. When the filter 64 is positioned between the lens 66 and the receiver 62 the light received by the lens 66 is incident upon the filter 64 over a range of angles determined by the lens 66.

The receiver controller 68 may also be microprocessor based, be an application-specific integrated circuit, or be formed of other logic devices known in the art. The receiver controller 68 may be a portion of a central vehicle main control unit, an interactive vehicle dynamics module, a restraints control module, a main safety controller, may be combined into a single integrated controller, such as with the illumination controller 50, or may be a stand-alone controller as shown.

The receiver system 18 may also include a memory 69. The memory 69 may be utilized to store algorithms, tables, formulas, or other conversion method or devices that may be utilized by the controller 68 in generating the fused image signals. The memory 69 may be in various forms and styles known in the art and may be part of the controllers 50 and 68.

Referring again to FIG. 2, the illumination controller 50 controls operation of the light source 46 and the thermal control system 41 whereas the receiver controller 68 controls operation of the receiver 62. The controllers 50 and 68 are coupled to and operate in synchronization with each other. The controllers 50 and 68 may be coupled to vision system controls 70, as are shown in FIG. 2, which are mounted on a center console 72. The system controls 70 may include activation switches, a light coupler position adjuster, an illumination beam brightness control, as well as other controls known in the art.

The indicator 26 may include a video system, an audio system, a heads-up display, a flat-panel display, a telematic system or other indicator known in the art. In one embodiment of the present invention, the indicator 26 is in the form of a heads-up display and the indication signal is a virtual image projected to appear forward of the vehicle 14. The indicator 26 provides a real-time image of the target area to increase the visibility of the objects during relatively low visible light level conditions without having to refocus ones eyes to monitor a display screen within the interior cabin 12.

The vision system 10 may also include the headlamps 74. Illumination generated by the headlamps may be utilized during generation of a dark image. This is further described with respect to the embodiment of FIG. 6.

Figure 5:
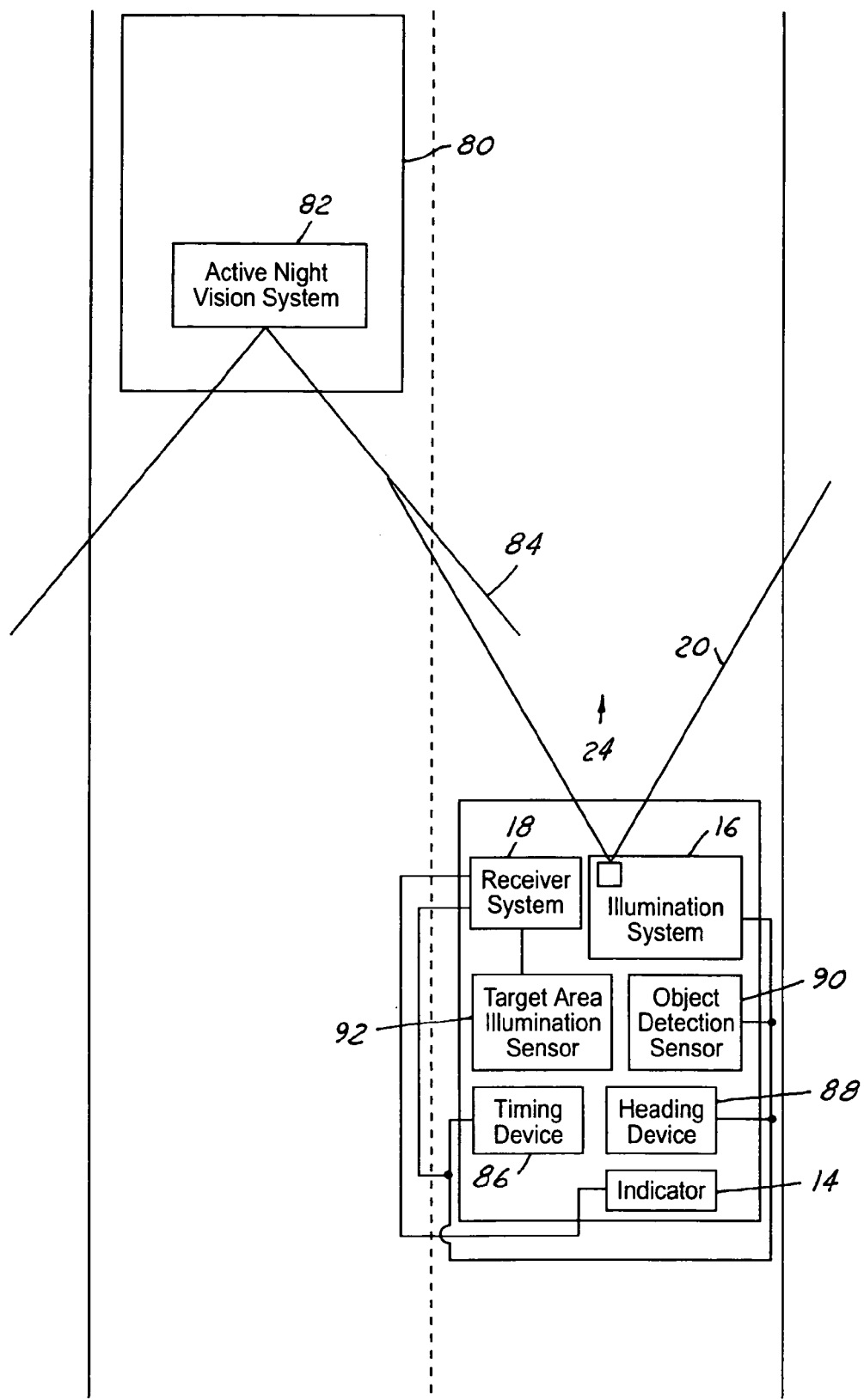
FIG. 5 is a block diagrammatic top view of a host vehicle utilizing an active night vision system and operating to account for the illumination presence of a non-host vehicle light source in accordance with an embodiment of the present invention.

Referring now to FIG. 5, a block diagrammatic top view of the host vehicle 14, utilizing the vision system 10 and approaching an oncoming vehicle 80 that is also utilizing an active night vision system 82, is shown in accordance with an embodiment of the present invention. The vision system 10 includes devices for the prevention of blinding or image saturation due to the generation of a second illumination beam 84 from the oncoming vehicle 80. These devices may include any of the following: a timing device 86, a heading device 88, an object detection sensor 90, and a target area illumination sensor 92, as well as other similar devices known in the art.

The timing device 86 provides a timing signal that is synchronized with a timing signal of the oncoming vehicle 80. The heading device 88 generates a heading signal that is indicative of the direction of travel of the host vehicle 14. The timing signal and the heading signal are utilized to assure that the illumination beam 20 is out-of-phase with the second illumination beam 84.

The timing device 86 and the heading device 88 may be in the form of a global positioning system (GPS), or may be separate devices, as shown. The timing device 86 may also be in the form of a receiver that, for example, receives a radio frequency timing signal from a time center, such as the National Institute of Standards and Technology (NIST). The heading device 88 may be in the form of a compass or other heading device known in the art that provides direction of travel information of the host vehicle 14.

The object detection sensor 90 may be used to detect vehicles in proximity with the host vehicle 14 and aid in the synchronization of timing therewith. The object detection sensor 90 may be in the form of an infrared transmitter and receiver, a radar transmitter and receiver, a camera, such as the receiver 62, or may be in some other form known in the art.

The object detection sensor 90 may also be in the form of an illumination sensor and may be used to detect illumination of the target area 24. For example, the object detection sensor 90 may be used to detect the presence of the second illumination beam 84 and the illumination intensity of the target area 24. The illumination intensity of the target area 24 may be due to the light emitted from the systems 10 and 82 and may also be from other light sources known in the art. Upon detection of the second illumination beam 84 the illumination controller 50 may adjust phase of the first illumination beam 20 to be out of phase with the second illumination beam 84.

The target area illumination sensor 92 may be in the form of a camera or an object detection sensor as suggested above, or may be in some other form known in the art. For example, the illumination sensor 92 may be in the form of an infrared detector or series of detectors.

Although in the following FIGS. 6 and 8 a couple of imaging algorithms are described, the algorithms are provided for example purposes only. Other algorithms, tables, formulas, or the like may be utilized, such as the algorithm provided by Benoist Fleury entitled, "Active Infrared Night Vision System", First International Congress on Vision, Rouen, France, 24 & 25 Sep. 2002.

Figure 7:
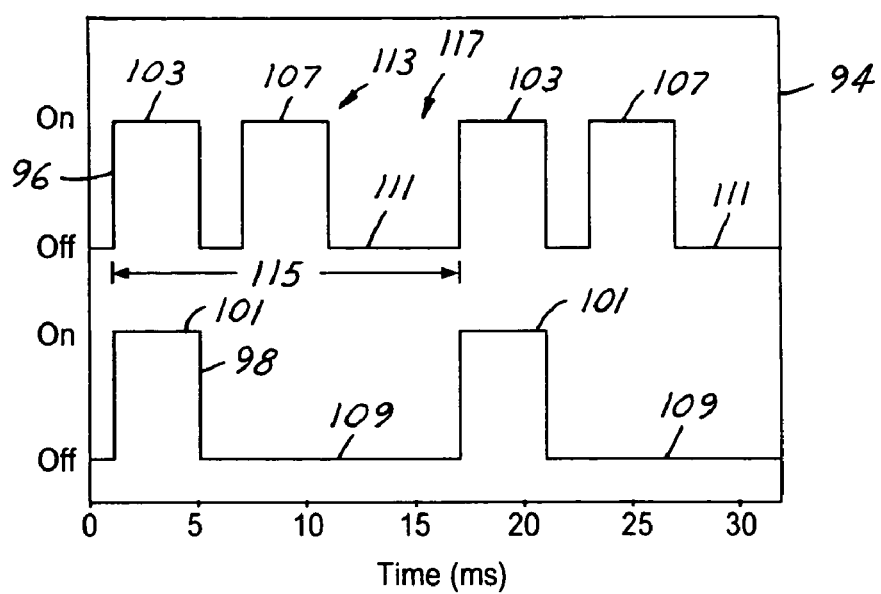
FIG. 7 is a sample timing sequence diagram illustrating operational timing of a light source and a receiver of an active night vision system in accordance with an embodiment of the present invention.
Figure 6:
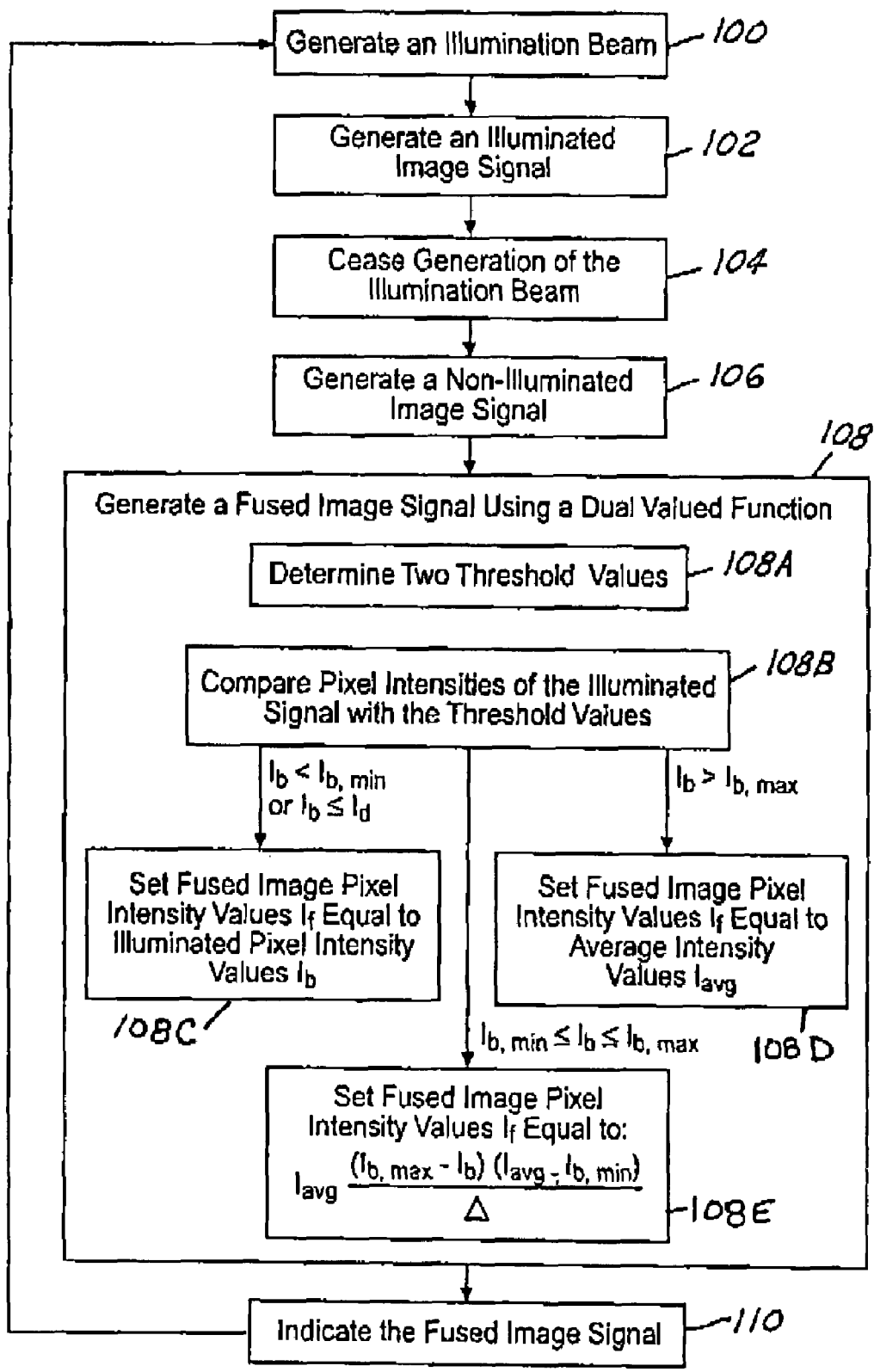
FIG. 6 is a logic flow diagram illustrating a method of forming an image within an imaging system utilizing a dual threshold algorithm in accordance with an embodiment of the present invention.

Referring now to FIGS. 6 and 7, a sample timing sequence diagram 94 illustrating operational timing of the light source 46 and the receiver 62 and a logic flow diagram illustrating a method of forming an image within the imaging system 10 utilizing a dual threshold algorithm in accordance with an embodiment of the present invention are shown. The timing diagram 94 includes a first timing sequence 96, corresponding to "ON" and "OFF" states of the receiver 62, and a second timing sequence 98, corresponding to ON and OFF states of the light source 46. The dual threshold algorithm is in essence a dual valued function as described in steps 108 below.

In step 100, the light source 46 is activated at a duty cycle and generates the illumination beam 20, which is represented by ON states 101 of timing sequence 98. The duty cycle may be approximately 25-30%.

In step 102, the receiver 62 generates a first image signal or an illuminated image signal in response to the reflection of the illumination beam 20 on objects within the target area 24. The illuminated signal is generated during a first ON state of the receiver 62, as shown by the first timing sequence 96 and as designated by the numerical designator 103. The illuminated signal may also be referred to as the "bright image". The illuminated signal has pixel intensity values $I_b$. Step 102 is performed simultaneously with step 100 such that the illumination source is in an ON state at approximately the same time that the receiver 62 receives the reflected portions of the illumination beam 20.

In step 104, the light source 46 ceases to generate the illumination beam 20. The light source 46 is deactivated, in an OFF state, or is simply not emitting the illumination beam 20.

In step 106, the receiver 62 generates a second image signal or a non-illuminated image signal. The non-illuminated signal is generated during a second ON state of the receiver 62, as also shown by the first timing sequence 96 and as designated by the numerical designator 107. Step 106 is performed while the light source 46 is in an OFF state. During the OFF state of the light source 46, which is designated by the numerical designator 109, the headlamps 74 produce enough light to provide clear unsaturated images of objects that are in close proximity with the host vehicle 14. The objects may have highly reflective services. The non-illuminated image signal 107 may also be referred to as the "dark image". The non-illuminated image signal 107 has pixel intensity values $I_d$.

In step 108, the receiver controller 68 generates a fused image signal in response to the illuminated signal and the non-illuminated signal. The fused image signal is generated during the OFF state of the receiver 62, as designated by the numerical designator 111. During the OFF state 111, the receiver controller 68 processes the information received from the illuminated signal and the non-illuminated signal. The controller 68 performs as a high-speed image processing board and is capable of providing an image in real time.

The controller 68 in generating the fused signal regards the illuminated signal and the non-illuminated signal as serial strings of individual pixels. The controller 68, via an algorithm, table, formula, or some other conversion method or device known in the art, utilizes pixels associated with the illuminated signal and corresponding pixels associated with the non-illuminated signal to form the fused signal. The conversion methods may be static or may be adjusted to adapt to overall image brightness or contrast. A couple of example algorithms are described below. The fused signal and the corresponding resultant image therefrom is a blend of the illuminated signal and the non-illuminated signal. The resultant image shows distant objects and nearby objects, which are unsaturated and includes the nearby objects that are highly reflective.

In step 108A, the two threshold values are determined. The threshold values may be predetermined values, may be determined in response to vehicle and active night vision system characteristics, or may be determined in response to a particular operating environment of the vehicle 14. The controller 68 determines a maximum image intensity value $I_{b,max}$ and a minimum image intensity value $I_{b,min}$.

In step 108B, the controller 68 compares the illuminated values $I_b$ with the maximum value $I_{b,max}$ and the minimum value $I_{b,min}$.

In step 108C, when the illuminated values $I_b$ are approximately less than the minimum value $I_{b,min}$ or when the illuminated values $I_b$ are approximately less than or equal to the corresponding non-illuminated values $I_d$ then the pixel intensity values of the fused image $I_f$ are set approximately equal to the illuminated values $I_b$.

In step 108D, when the illuminated values $I_b$ are approximately greater than or equal to the minimum value $I_{b,min}$ and approximately less than or equal to the maximum value $I_{b,max}$ then the fused values $I_f$ are determined to satisfy equation 1.

$$I_f = I_{avg} - \frac{(I_{b,\max} - I_b)(I_{avg} - I_{b,\min})}{\Delta} \quad (1)$$

The average intensity values $I_{avg}$ are approximately equal to the sum of the illuminated values $I_b$ and the non-illuminated values $I_d$ divided by two, as shown by equation 2.

$$I_{avg} = \frac{I_b + I_d}{2} \quad (2)$$

Threshold difference $\Delta$ is approximately equal to the maximum value $I_{b,\max}$ minus the minimum value $I_{b,\min}$.

In step 108E, when the illuminated values $I_b$ are approximately greater than the maximum value $I_{b,\max}$ then the fused values $I_f$ are set approximately equal to the average values $I_{avg}$.

Steps 100-108E are performed for each image frame. The illuminated signal and the non-illuminated signal are generated during one frame time period, which may be approximately 16 ms for a 60 Hz refresh rate. Timing of steps 100-108 is illustrated by the timing sequences 96 and 98 of FIG. 7. The first timing sequence 96 illustrates the timing of generated image processing signals. The illuminated signal and the non-illuminated signal are generated close in time and during a leading portion or front end 113 of a refresh time 115. The remaining portion 117 of the refresh time 115 may be utilized for processing and generation of the fused signal.

The second timing sequence 98 illustrates the timing of the illumination beam 20. The light source 46 is ON during generation of the illuminated signal and OFF during generation of the non-illuminated signal and the fused signal.

In step 110, the fused image signal is indicated to vehicle occupants in the form of an image via the indicator 26. Upon completion of step 110 the controller 68 returns to step 100.

Figure 8:
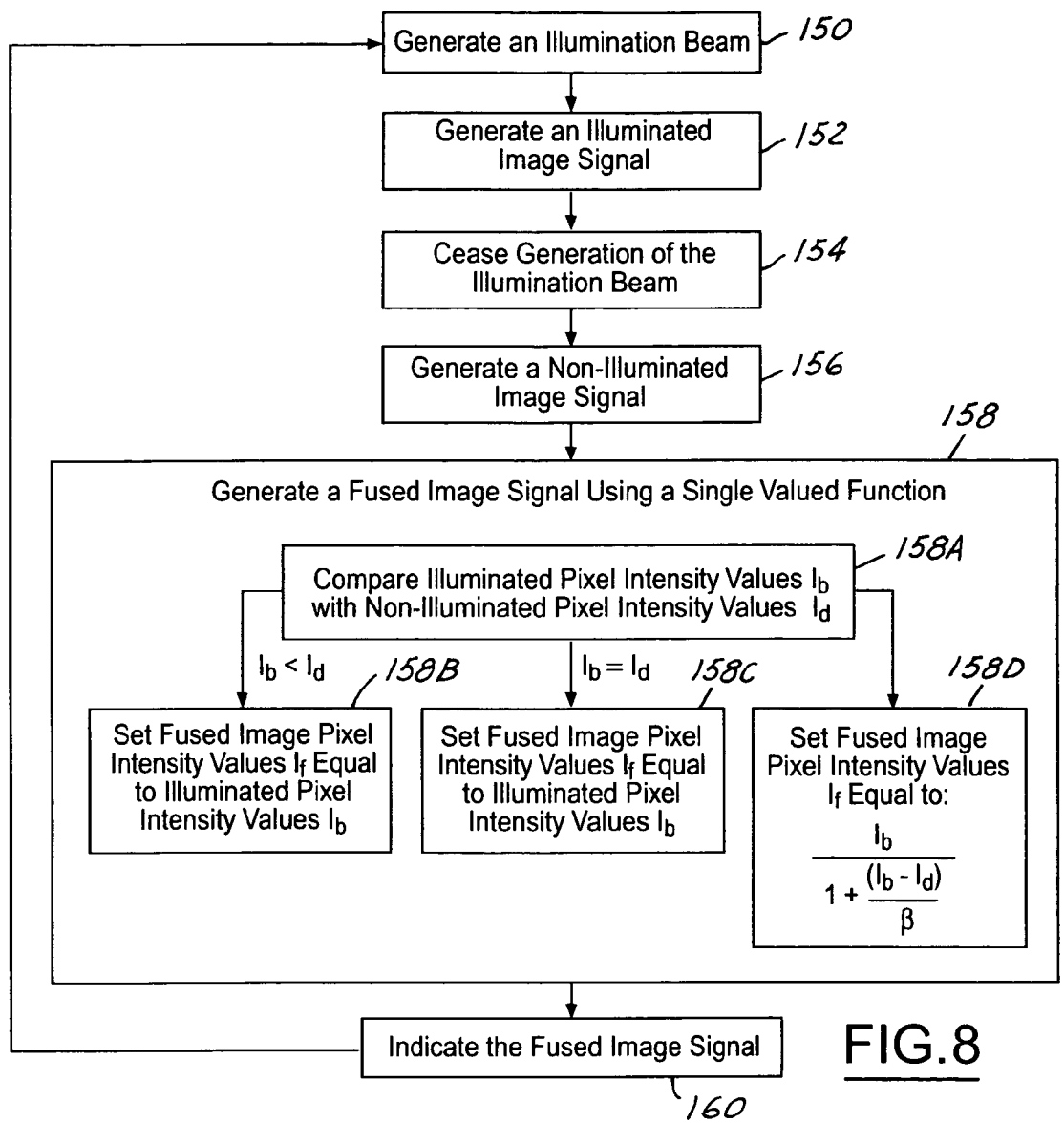
FIG. 8 is a logic flow diagram illustrating a method of forming an image within an imaging system utilizing an extrapolated contour line algorithm in accordance with another embodiment of the present invention.

Referring now to FIG. 8, a logic flow diagram illustrating a method of forming an image within the imaging system 10 utilizing an extrapolated contour line algorithm in accordance with another embodiment of the present invention is shown. Steps 150-156 are similar to steps 100-106 and for simplicity of description are not repeated below.

Figure 9:
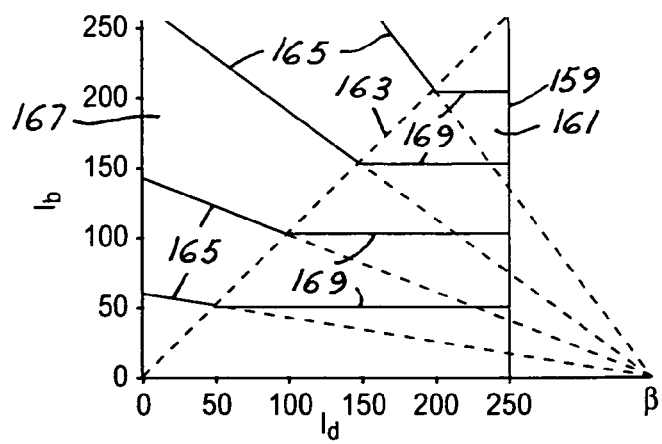
FIG. 9 is a sample look-up table for the extrapolated contour line algorithm of FIG. 8 in accordance with an embodiment of the present invention.

In step 158, the receiver controller 68, as in step 108, generates a fused image signal in response to the illuminated signal and the non-illuminated signal. A single valued function $I_f(I_b,I_d)$ is utilized, as opposed to the dual valued function used with respect to the embodiment of FIG. 6. The fused values $I_f$ are mapped over a square region indexed by the illuminated values $I_b$ and the non-illuminated values $I_d$, as shown in the look-up table 159 of FIG. 9. The look-up table may be stored in the memory 69.

In step 158A, the controller 68 compares the illuminated values $I_b$ with the non-illuminated values $I_d$.

In step 158B, when the illuminated values $I_b$ are less than the non-illuminated values $I_d$, then the fused values $I_f$ are set approximately equal to the illuminated values $I_b$. This is represented by the area 161 within the lower right triangle of the table 159.

In step 158C, when the illuminated values $I_b$ are approximately equal to the non-illuminated values $I_d$ then the fused values $I_f$ are set approximately equal to the illuminated values $I_b$, which as stated is approximately equal to the non-illuminated values $I_d$. A centerline 163, having a slope approximately equal to one, is shown and represents when the fused values $I_f$ are equal to both the illuminated values $I_b$ and the non-illuminated values $I_d$.

In step 158D, when the illuminated values $I_b$ are approximately greater than the non-illuminated values $I_d$ then the fused values $I_f$ are set to satisfy equation 3, where $\beta$ is a predetermined value.

$$I_f = \frac{I_b}{1 + \frac{(I_b - I_d)}{\beta}} \quad (3)$$

A first set of contour lines 165 that have constant fused image intensity values, which are shown in the upper left triangle 167 of the table 159, meet along the center line 163 with a second set of contour lines 169. The second set of contour lines 169 have the same constant fused image intensity values as that of the first contour lines 169, which are shown in the area 161. The first contour lines 165 are extended through the area 161 to meet at a point on and along the axis of the non-illuminated values $I_d$. The value of this point is $\beta$, which may be a predetermined value. The predetermined value $\beta$ represents a determined amount of intensity units away from the origin (0,0).

As the value of $\beta$ increases, the first contour lines 165 rotate such that they are increasingly horizontal, whereby the fused values $I_f$ are approximately equal to the illuminated values $I_b$. As the value of $\beta$ decreases, the first contour lines 165 rotate such that they are increasingly vertical, which results in the fused values $I_f$ becoming more dependent on the non-illuminated values $I_d$.

In an example embodiment of the present invention, the value of $\beta$ is equal to 510. In this embodiment, for the brightest pixel intensities of the illuminated values $I_b$, the fused values $I_f$ are set to have pixel intensity values approximately equal to an average of the illuminated values $I_b$ and the non-illuminated values $I_d$. In other words, the fused values $I_f$ are set equal to a 50%-50% mixture of pixel intensities from the illuminated signal and from the non-illuminated signal.

In another example embodiment of the present invention, the value of $\beta$ is equal to 255. The slopes of the first contour lines 165 vary such that the lines range from being horizontal to being vertical. The fused values $I_f$ are set approximately equal to the illuminated values $I_b$ for the darkest pixel intensities of the illuminated values $I_b$. The fused values $I_f$ are set approximately equal to non-illuminated values $I_d$ for the brightest pixel intensities of the illuminated pixel intensity values $I_b$. The fused values $I_f$ are set equal to a 50%-50% mixture, as described above, for pixel intensities of the illuminated values $I_b$ that are within a middle range. Although only a couple sample values of $\beta$ are provided above, various other values of $\beta$ may be utilized.

The value of $\beta$ may vary and be adapted for real time applications. The value of $\beta$ may be higher for rural environments and lower for urban environments. Thus, multiple look-up tables may be stored in the memory 69 and be used depending upon the application. The value of $\beta$ may vary depending upon the median intensity of a previous illuminated image signal.

In order to utilize a full intensity range, the fused values $I_f$ may be rescaled. The full intensity range refers to the range between zero or the origin and the value of $\beta$. The rescaling is referred to as the dark current correction. The dark current correction may be performed after the generation of the fused image signal, incorporated into a look-up table to aid in the generation of the fused image signals in real time, or may be performed or incorporated at other times and using other methods known in the art.

As with steps 100-108E, steps 150-158D are performed for each image frame. In step 160, the fused image signal is indicated to vehicle occupants in the form of an image via the indicator 26. Upon completion of step 160 the controller 68 returns to step 150.

The above-described methods minimize saturation of images due to the proximity of highly reflective objects within the target area 24 without negatively affecting the view of other objects within the target area 24. Objects that are not highly reflective remain viewable within the generated images. The methods, thus, provide a clear view of the target area 24.

The above-described methods may have additional steps to account for the situations when one or more vehicles other than the host vehicle 14 are also generating illumination beams and illuminating the target area 24. The additional steps are provided below with respect to the embodiment of FIG. 10.

Figure 10:
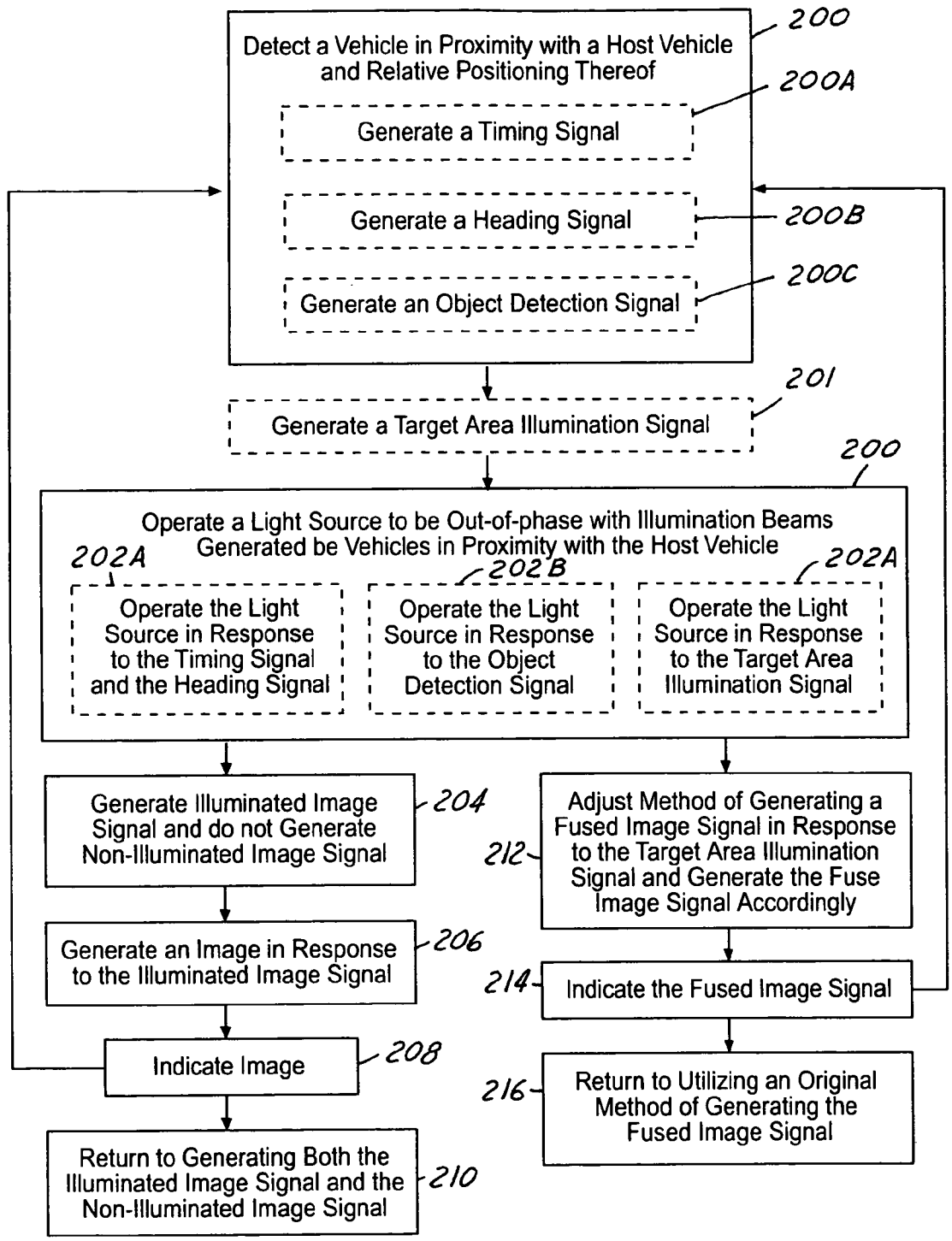
FIG. 10 is a logic flow diagram illustrating a method of preventing the saturation of images due to the illumination of a target area by a non-host vehicle light source in accordance with another embodiment of the present invention.

Referring now to FIG. 10, a logic flow diagram illustrating a method of preventing the saturation of images due to the illumination of the target area 24 by a non-host vehicle light source in accordance with another embodiment of the present invention is shown.

In step 200, the object detection sensor 90 is utilized to detect a vehicle in proximity with the host vehicle 14. In step 200A, the timing device 86 may be used to generate a timing signal, as stated above. In step 200B, the heading device 88 may be used to generate a heading signal, as stated above. In step 200C, the object detection sensor 90 may be used to generate an object detection signal, also as stated above.

In step 201, an illumination sensor, such as the illumination sensor 92, the receiver 62, or the object detection sensor 90 may be utilized to detect whether the detected vehicles are illuminating the target area 24. When the detected vehicles are illuminating the target area 24 the illumination sensor generates a target area illumination signal that is indicative of such illumination.

In step 202, when a vehicle is detected, such as the oncoming vehicle 80 of FIG. 5, the illumination controller 50 may adjust phase of or operate the light source 46 such that the first illumination beam 20 is out-of-phase with the illumination beams generated by the detected vehicles. In step 202A, the controller 50 may operate the light source 46 such that the phase of the first illumination beam 20 corresponds with and is generated in response to the timing signal and the heading signal. The use of the timing signal and the heading signal assures that the host vehicle 14 is time synchronized with the detected vehicles and that the host vehicle 14 generates the illumination beam 20 out-of-phase with the illumination beams generated by the detected vehicles. In step 202B, the controller 50 may adjust phase of the light source 46 in response to direct communication with the detected vehicles. In step 202C, the controller 50 may adjust phase of the light source 46 in response to the target area illumination signal.

In step 204, the receiver controller 68 switches from generating both the illuminated signal and the non-illuminated signal to generating the illuminated signal and not the non-illuminated signal.

In step 206, the controller 68 generates an image signal in response to the illuminated signal, using techniques known in the art. The controller 68 does not use one of the above-stated algorithms to generate a fused image signal, but rather uses the illuminated signal to generate the image signal.

In step 208, the image signal is indicated to the vehicle occupants via the indicator 26.

In step 210, when the detected vehicles are no longer illuminating the target area 24, the controller 68 returns to generating both the illuminate signal and the non-illuminated signal and may return to either step 100 or step 150, otherwise the controller returns to step 200.

In step 212, when the target area illumination signal is below a predetermined level, the receiver controller 68 may adjust or switch the algorithm, table, or formula in the generation of the fused image signal. For example, when the target area 24 is illuminated by some other source other than by the light source 46 and the illumination intensity is less than desirable, the receiver controller 68 may decrease the value of $\beta$, with respect to the embodiment of FIG. 8. In other words, the resulting fused values $I_f$ are thereby more dependent on the non-illuminated values $I_d$ as opposed to the illuminated values $I_b$. By decreasing the value of $\beta$ the fused image signal, as stated, becomes more dependent upon the non-illuminated signal, which in this situation corresponds to illumination of the target area 24 by a non-host vehicle source. Other adjustments for various other situations would be apparent to one skilled in the art.

In step 214, the fused image signal is indicated to the vehicle occupants in the form of an image via the indicator 26.

In step 216, when the detected vehicles are no longer illuminating the target area 24, the controller 68 may return to step 100 or step 150, otherwise the controller 68 returns to step 200.

In performing steps 200-216 the system 10 prevents blinding and saturation from illumination beams generated by vehicles in proximity with the host vehicle 14.

The above-described steps are meant to be illustrative examples; the steps may be performed sequentially, synchronously, simultaneously, or in a different order depending upon the application. Also, The above-described methods provide gradual merging of the illuminated signals with the non-illuminated signals, as opposed to abrupt switching therebetween. The gradual merging provides images of the target area 24 that appear natural and realistic.

The present invention provides a vision system that is capable of generating an image through the fusion of dual images from a single receiver. The fusion of dual images improves image clarity of a target area. The present invention provides the fused images without generating artifacts from misregistration between adjacent images or image signals, such as between an illuminated image signal and an adjacent non-illuminated image signal. Also, the present invention is capable of generating active night vision images without being negatively affected by non-host vehicle light sources.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A vision system for a vehicle comprising:

a light source generating an illumination beam;

a receiver generating a first image signal and a second image signal, at least one of said first image signal and said second image signal being generated in response to at least a reflected portion of said illumination beam; and a controller coupled to said light source and said receiver, said controller generating an image in response to said first image signal and said second image signal;

wherein said receiver in generating a first image signal and a second image signal generates an illuminated image signal having pixel intensity values $I_b$ and a non-illuminated image signal having pixel intensity values $I_d$;

wherein said controller generates said image in response to a maximum image intensity threshold $I_{b,max}$ and a minimum image intensity threshold $I_{b,min}$; and wherein said controller determines pixel intensity values of at least a portion of said image to be approximately equal to $$I_{avg} - \frac{(I_{b,max} - I_b)(I_{avg} - I_{b,min})}{\Delta},$$

where average intensity values $I_{avg}$ are approximately equal to $$\frac{I_b + I_d}{2}$$

and threshold difference $\Delta$ is approximately equal to $I_{b,max} - I_{b,min}$.

2. A vision system for a vehicle comprising:

a light source generating an illumination beam;

a receiver generating a first image signal and a second image signal, at least one of said first image signal and said second image signal being generated in response to at least a reflected portion of said illumination beam; and a controller coupled to said light source and said receiver, said controller generating an image in response to said first image signal and said second image signal;

wherein said receiver in generating a first image signal and a second image signal generates an illuminated image signal having pixel intensity values $I_b$ and a non-illuminated image signal having pixel intensity values $I_j$; and wherein said controller determines pixel intensity values of at least a portion of said image to be approximately equal to $$\frac{I_b}{1 + \frac{(I_b - I_d)}{\beta}},$$

where $\beta$ is a predetermined value.

* * * * *